US011551008B2

(12) United States Patent
Pan et al.

(10) Patent No.: US 11,551,008 B2
(45) Date of Patent: Jan. 10, 2023

(54) METHOD AND DEVICE FOR TEXT PROCESSING

(71) Applicant: Beijing Xiaomi Intelligent Technology Co., Ltd., Beijing (CN)

(72) Inventors: Xiaotong Pan, Beijing (CN); Zuopeng Liu, Beijing (CN)

(73) Assignee: Beijing Xiaomi Intelligent Technology Co., Ltd., Beijing (CN)

(*) Notice: Subject to any disclaimer, the term of this patent is extended or adjusted under 35 U.S.C. 154(b) by 584 days.

(21) Appl. No.: 16/693,368

(22) Filed: Nov. 24, 2019

(65) Prior Publication Data

US 2020/0342173 A1 Oct. 29, 2020

(30) Foreign Application Priority Data

Apr. 28, 2019 (CN) .......................... 201910349382.1

(51) Int. Cl.
G06F 17/00 (2019.01)
G06F 40/30 (2020.01)
G06F 40/253 (2020.01)
G06F 40/166 (2020.01)

(52) U.S. Cl.
CPC ............ G06F 40/30 (2020.01); G06F 40/166 (2020.01); G06F 40/253 (2020.01)

(58) Field of Classification Search
CPC ...... G06F 40/253; G06F 40/166; G06F 40/30; G06F 16/345; G06F 17/271; G06F 17/274; G06F 17/2775
See application file for complete search history.

(56) References Cited

U.S. PATENT DOCUMENTS

| 6,374,210 B1* | 4/2002 | Chu ........................ G06F 40/53 704/9 |
| 10,515,138 B2* | 12/2019 | Walker .................. G06F 40/253 |
| 10,650,191 B1* | 5/2020 | Sandhu ................. G06F 16/313 |
| 2002/0040292 A1 | 4/2002 | Marcu |

(Continued)

FOREIGN PATENT DOCUMENTS

| CN | 102298642 A | 12/2011 |
| CN | 106156041 A | 11/2016 |

(Continued)

OTHER PUBLICATIONS

Jiao, Yiyu, "A Method of Calculating Comment Text Similarity Based on Tree Structure", 2015 7th International Conference on Intelligent Human-Machine Systems and Cybernetics (vol. 1, pp. 220-223), Aug. 27, 2015. (Year: 2015).*

(Continued)

*Primary Examiner* — Laurie A Ries
(74) *Attorney, Agent, or Firm* — Syncoda LLC; Feng Ma

(57) ABSTRACT

A text processing method includes: word segmentation is performed on a first text to be processed to determine multiple words of the first text; one word is removed from the first text to obtain one second text; each word is removed from the first text one by one to obtain a second text set; the first text and each second text in the second text set are analyzed respectively to obtain a first tree structure of the first text and a second tree structure of each second text; and a summary text of the first text is determined according to the first tree structure and each second tree structure.

20 Claims, 13 Drawing Sheets

(56) References Cited

U.S. PATENT DOCUMENTS

| | | | |
|---|---|---|---|
| 2002/0046018 A1 | | 4/2002 | Marcu |
| 2004/0044519 A1* | | 3/2004 | Polanyi ................... G06F 40/35 |
| | | | 707/E17.058 |
| 2004/0054521 A1* | | 3/2004 | Liu ....................... G06F 40/268 |
| | | | 704/5 |
| 2004/0162806 A1* | | 8/2004 | Liu ....................... G06F 40/194 |
| 2011/0153673 A1* | | 6/2011 | Boschee ............... G06F 16/334 |
| | | | 707/E17.098 |
| 2012/0288207 A1* | | 11/2012 | Sun ...................... G06F 16/353 |
| | | | 382/224 |
| 2016/0283588 A1* | | 9/2016 | Katae ................... G06F 16/345 |
| 2017/0161242 A1* | | 6/2017 | Clark .................... G06F 40/151 |
| 2020/0126440 A1* | | 4/2020 | Sindhgatta ............. G06F 40/56 |

FOREIGN PATENT DOCUMENTS

| | | |
|---|---|---|
| CN | 107748742 A | 3/2018 |
| CN | 109684644 A | 4/2019 |
| JP | 2011076194 A | 4/2011 |
| WO | 0186489 A2 | 11/2001 |
| WO | 2009131417 A2 | 10/2009 |

OTHER PUBLICATIONS

Saziye Betul Ozates et al: "Sentence Similarity based on Dependency Tree Kernels for Multi-document Summarization", Jan. 1, 2016 (Jan. 1, 2016), XP055696978, the whole document.

Abigail See, etc., "Get To The Point: Summarization with Pointer-Generator Networks", Apr. 25, 2017 (Apr. 25, 2017).

Alexander M. Rush, etc., "A neural attention model for abstractive sentence summarization", Sep. 3, 2015 (Sep. 3, 2015).

Jianpeng Cheng, etc., "Neural Summarization by Extracting Sentences and Words", Jul. 1, 2016 (Jul. 1, 2016).

Ramesh Nallapati, etc., "SummaRuNNer: A Recurrent Neural Network Based Sequence Model for Extractive Summarization of Documents", Nov. 14, 2016 (Nov. 14, 2016).

Sumti Chopra, etc., "Abstractive sentence summarization with attentive recurrent neural networks", Jun. 12-17, 2016 (Jun. 12-17, 2016).

Jiwei Tan etc., "Abstractive document summarization with a graph-based attentional neural model", Jul. 30-Aug. 4, 2017 (Jul. 30-Aug. 4, 2017).

Qingyu Zhou, etc., "Selective encoding for abstractive sentence summarization", Apr. 24, 2017 (Apr. 24, 2017).

Ziqiang Cao, etc., "AttSum: Joint Learning of Focusing and Summarization with Neural Attention", Sep. 27, 2016 (Sep. 27, 2016).

Romain Paulus, etc., "A deep reinforced model for abstractive summarization", Nov. 13, 2017 (Nov. 13, 2017).

Oriol Vinyals, etc., "Pointer networks", Jan. 2, 2017 (Jan. 2, 2017).

Supplementary European Search Report in the European application No. 19211879.2, dated Jun. 2, 2020.

* cited by examiner

| Word | Child node (first text) | Child node (second text) | Score of node full match | Score of node part match | |
|---|---|---|---|---|---|
| | | | | Jaccard distance score | Hierarchical discount score |
| Today | | | | | |
| Beijing | | | | | |
| The Forbidden City | Beijing/Of | Beijing/Of | 1 | 1 | 1 |
| Of | | | | | |
| Weather | The Forbidden City | The Forbidden City | 1 | 1 | 1 |
| Good | Today/Weather/,/Many | Today/,/Many | 0 | 0.75 | 0.5 |
| , | | | | | |
| People | | | | | |
| Many | People | People | 1 | 1 | 1 |
| Total | | | 3 | 3.75 | 3.5 |

FIG. 8

METHOD AND DEVICE FOR TEXT PROCESSING

CROSS-REFERENCE TO RELATED APPLICATION

This application claims priority to Chinese patent application No. 201910349382.1 filed on Apr. 28, 2019, the disclosure of which is hereby incorporated by reference in its entirety.

BACKGROUND

Typically, graph ranking, deep learning and the like are usually adopted to extract, from a text, a summary text capable of expressing the theme of the text and has a length shorter than a length of the text. According to the graph ranking method, commonly used stop words, prefixes and suffixes or part-of-speech information, etc. may be adopted to filter a redundant text out.

SUMMARY

The present disclosure generally relates to the technical field of computers, and more particularly, to a method and device for text processing.

This summary is provided to introduce a selection of aspects of the present disclosure in a simplified form that are further described below in the Detailed Description. This summary is not intended to identify key features or essential features of the claimed subject matter, nor is it intended to be used to limit the scope of the claimed subject matter.

According to a first aspect of embodiments of the present disclosure, a method for text processing is provided, which may include that:

word segmentation is performed on a first text to be processed to determine multiple words of the first text;

one word in the multiple words of the first text is removed from the first text to obtain one second text;

each word is removed from the first text one by one to obtain a second text set;

the first text and each second text in the second text set are analyzed respectively to obtain a first tree structure of the first text and a second tree structure of the each second text, each of the multiple words in the first text being a node of the first tree structure and each of words in the second text being a node of the second tree structure; and a summary text of the first text is determined according to the first tree structure and the each second tree structure.

According to a second aspect of the embodiments of the present disclosure, a device for text processing is provided, which is characterized by including:

a processor; and a memory configured to store an instruction executable for the processor, wherein the processor may be configured to execute blocks of:

performing word segmentation on a first text to be processed to determine multiple words of the first text;

removing, from the first text, one word in the multiple words of the first text to obtain one second text;

removing each word from the first text one by one to obtain a second text set;

analyzing the first text and each second text in the second text set respectively to obtain a first tree structure of the first text and a second tree structure of the each second text, wherein each of the multiple words in the first text is a node of the first tree structure, and each of words in the each second text is a node of the each second tree structure; and determining a summary text of the first text according to the first tree structure and the each second tree structure.

According to a third aspect of the embodiments of the present disclosure, a non-transitory computer-readable storage medium is provided, having an instruction therein, when executed by a processor, to enable the processor to execute the method for text processing.

It is to be understood that the above general descriptions and detailed descriptions below are only exemplary and explanatory and not intended to limit the present disclosure.

BRIEF DESCRIPTION OF THE DRAWINGS

The accompanying drawings referred to in the specification are a part of this disclosure, and provide illustrative embodiments consistent with the disclosure and, together with the detailed description, serve to illustrate some embodiments of the disclosure.

FIG. 8 is a schematic diagram illustrating scores of structure match, according to some embodiments of the present disclosure.

DETAILED DESCRIPTION

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the present disclosure. Instead, they are merely examples of apparatuses and methods consistent with aspects related to the present disclosure as recited in the appended claims.

Terms used in the present disclosure are only adopted for the purpose of describing specific embodiments but not intended to limit the present disclosure. "A/an", "said" and "the" in a singular form in the present disclosure and the appended claims are also intended to include a plural form, unless other meanings are clearly denoted throughout the present disclosure. It is also to be understood that term "and/or" used in the present disclosure refers to and includes one or any or all possible combinations of multiple associated items that are listed.

It is to be understood that "first", "second" and similar terms used in the specification and claims of the present application are not to represent any sequence, number or importance but only to distinguish different parts. Likewise, similar terms such as "a/an" also do not represent a number limit but represent "at least one." Terms like "include" or "contain" refer to that an element or object appearing before "include" or "contain" covers an element or object and equivalent thereof listed after "include" or "contain" and does not exclude another element or object. Similar terms such as "connect" or "interconnect" are not limited to physical or mechanical connection, and may include electrical connection, either direct or indirect.

The embodiments of the present disclosure will be described below in combination with the accompanying drawings in detail. Characteristics in the following embodiments and implementation modes may be combined without conflicts.

A graph ranking method can have some limitations, for example, key information is easily ignored, information such as a word order and a syntactic structure is not considered, the obtained summary text may be not fluent. For the deep learning method, a deep learning model is needed to be trained based on a large amount of annotation data, and statistical information of words is needed to be determined based on annotations in context to finally determine the summary text, and moreover, in this method, the word order, syntactic structure and the like information are not considered either.

Figure 1:
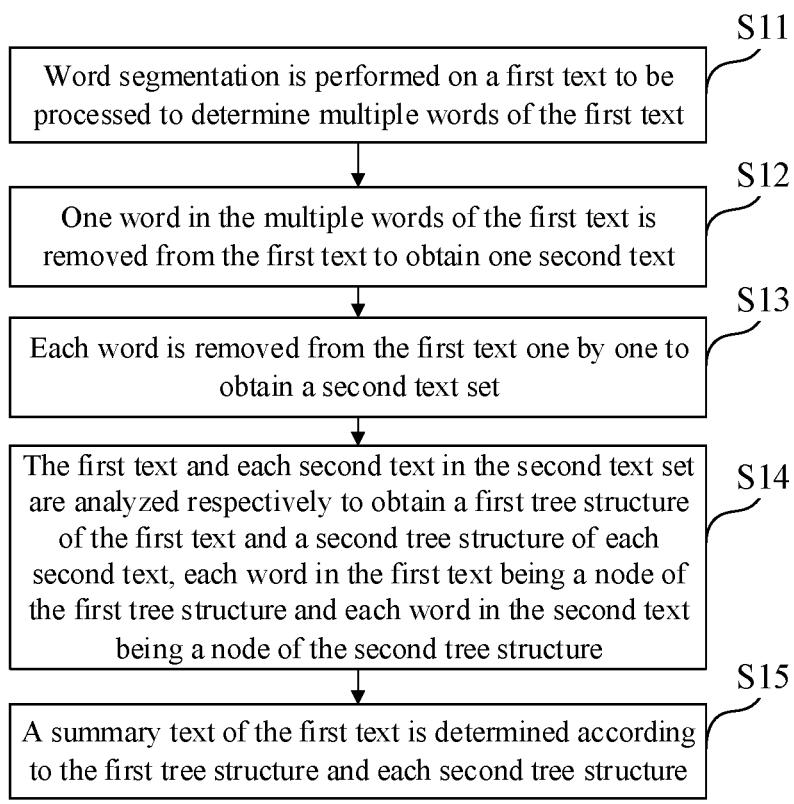
FIG. 1 is a flowchart illustrating a method for text processing, according to some embodiments of the present disclosure.

FIG. 1 is a flowchart illustrating a method for text processing, according to some embodiments of the present disclosure. As shown in FIG. 1, the method includes the following blocks.

In block S11, word segmentation is performed on a first text to be processed to determine multiple words of the first text.

In block S12, one word in the multiple words of the first text is removed from the first text to obtain a second text.

In block S13, each word is removed from the first text one by one to obtain a second text set.

In block S14, the first text and each second text in the second text set are analyzed respectively to obtain a first tree structure of the first text and a second tree structure of each second text. Each word in the first text is a node of the first tree structure and each word in the second text is a node of the second tree structure.

In block S15, a summary text of the first text is determined according to the first tree structure and each second tree structure.

According to the method for text processing of the embodiments of the present disclosure, each word in the first text may be deleted to obtain each second text corresponding to each word of the first text, so that the probability of ignoring key information is reduced. The first text and each second text are analyzed to obtain the tree structures formed by the words, including word orders and syntactic structures of the first text and the second texts, so that the obtained summary text is semantically fluent.

In some embodiments, the method for text processing may be executed by a terminal device, the terminal device may be User Equipment (UE), a mobile device, a user terminal, a terminal, a cell phone, a cordless phone, a Personal Digital Assistant (PDA), a handheld device, a computing device, a vehicle-mounted device, a wearable device and the like. The method may be implemented by a processor by calling a computer-executable instruction stored in a memory. Or, the terminal device may acquire the first text and send the first text to a server, so that the method is executed by the server.

In some embodiments, in the block S11, the first text to be processed may be a structure formed by the multiple words such as a paragraph, a sentence, a word group and a phrase. Word segmentation may be performed on the first text according to sememe of the first text and sememe of each word of the first text to determine the multiple words of the first text. For example, word segmentation may be performed on the first text through a word segmentation method, such as a maximum matching algorithm, a minimum matching algorithm, a backtracking method and a deep-learning-based word segmentation algorithm, to determine the multiple words of the first text.

In an example, the first text may be a sentence, for example, "今天北京故宫的 天气很好，人很多 (Good weather of the Forbidden City Beijing today, many people)". Any one of the aforesaid word segmentation methods may be adopted for the sentence to determine multiple words of the sentence. In the example, the multiple words of the sentence may be segmented by use of any word segmentation method based on sememe of each word of the sentence to obtain "今天/北京/故宫/的/天气/很好/，/人/ 很多 today/Beijing/the Forbidden City/of/weather/good/, /people/many)", namely the multiple words of the sentence are "今天 (today)", "北京 (Beijing)", "故宫 (the Forbidden City)", "的 (of)", "天气 (weather)", "很好 (good)" ",", "人 (people)" and "很多 (many)" respectively.

In some embodiments, in the block S12, one word may be removed from the first text to obtain a second text, and the obtained second text may correspond to the removed word. For example, the first text is formed by n (n is a positive integer) words, the kth (1≤k≤n) word in the first text may be removed, and the left n−1 words in the first text may form a second text corresponding to the kth word, an order of the left n−1 words in the first text is kept unchanged. For example, word segmentation is performed on the first text to obtain "今天/北京/故宫/的/天气/很好/，/人/很多 (today/Beijing/the Forbidden City/of/weather/good/, /people/many)", and "今天 (today)" may be removed to obtain a second text "北京/故宫/的/天气/很好/，/人/很多 (Beijing/the Forbidden City/of/weather/good/, /people/many)".

In some embodiments, in the block S13, each word in the first text may be removed one by one to obtain the second text set. For example, the first word in the first text may be removed to obtain the second text corresponding to the first word, the second word in the first text may be removed to obtain the second text corresponding to the second word, . . . , the nth word in the first text may be removed to obtain the second text corresponding to the nth word. The first text includes n words, and thus n second texts may be obtained, and the n second texts form the second text set.

In the example, the first text is "今天北京故宫的天气很好，人很多 (Good weather of the Forbidden City Beijing today, many people)". After word segmentation is carried out, each word may be removed to obtain multiple second texts. For example, "今天 (today)" is removed to obtain the second text "北京/故宫/的/天气/很好/, /人/很多 (Beijing/the Forbidden City/of/weather/good/, /people/many)"; "北京 (Beijing)" is removed to obtain a second text "今天/故宫/的天气/很好/, /人/很多 (today/the Forbidden City/of/weather/good/, /people/many)"; "故宫 (the Forbidden City)" is removed to obtain a second text "今天/北京/的天气/很好/, /人/很多 (today/Beijing/of/weather/good/, /people/many)"; "的 (of)" is removed to obtain a second text "今天/北京/故宫/天气/很好/, /人/很多 (today/Beijing/the Forbidden City/weather/good/, /people/many)"; "天气 weather)" is removed to obtain a second text " 今天/北京/故宫/的/很好/, /人/很多 (today/Beijing/the Forbidden City/good/, /people/many)"; "很好 (good)" is removed to obtain a second text "今天/北京/故宫/的天 气/, /人/很多 (today/Beijing/the Forbidden City/of/weather/, /people/many)"; "," is removed to obtain a second text "今天/北京/故宫/的天 气/很好/人/很多 (today/Beijing/the Forbidden City/of/weather/good/people/many)"; "人 (people)" is removed to obtain a second text "今天/北京/故宫/的天 气/很好/,/很多 (today/Beijing/the Forbidden City/of/weather/good/, many)"; and "很多 (many)" is removed to obtain a second text " 今天/北京/故宫/ 的天气/很好/, /人 (today/Beijing/the Forbidden City/of/weather/good/, /people)". The multiple second texts form the second text set.

In some embodiments, in the block S14, the first text and the multiple second texts may be analyzed respectively, for example, analysis is performed according to sememe of the first text and the second texts and sememe of the words therein, and the first tree structure of the first text and the second tree structure of each second text may be obtained; each word in the first text is a node of the first tree structure and each word in the second text is a node of the second tree structure.

Figure 2:
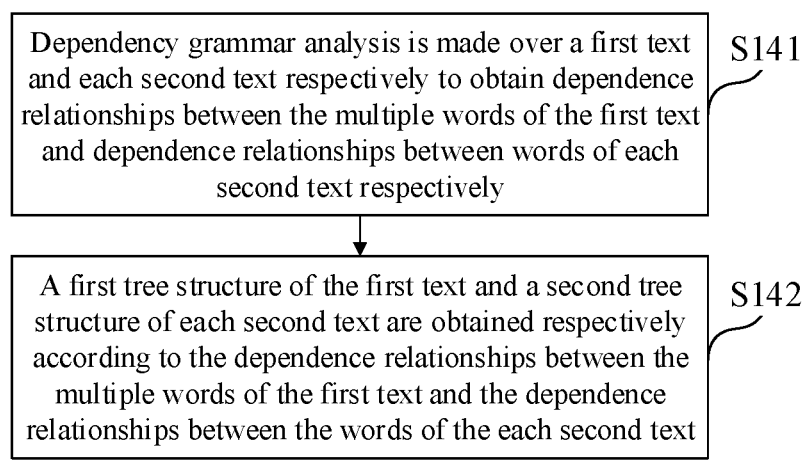
FIG. 2 is a flowchart illustrating the block S13 of a method for text processing, according to some embodiments of the present disclosure.

FIG. 2 is a flowchart illustrating the block S14 of a method for text processing, according to some embodiments of the present disclosure. As shown in FIG. 2, the block S14 includes the following blocks.

In the block S141, dependency grammar analysis is made over the first text and each second text respectively to obtain dependence relationships between the multiple words of the first text and dependence relationships between words of each second text respectively.

In the block S142, a first tree structure of the first text and a second tree structure of each second text are obtained respectively according to the dependence relationships between the multiple words of the first text and the dependence relationships between the words of the each second text.

In some embodiments, in the block S141, dependency grammar dependency grammar analysis may be made over the first text and each second text respectively to obtain the dependence relationships between the multiple words of the first text and the dependence relationships between words of each second text.

In the example, dependency grammar dependency grammar analysis over the first text may be made to obtain the dependence relationships between the multiple words of the first text.

Figure 3:
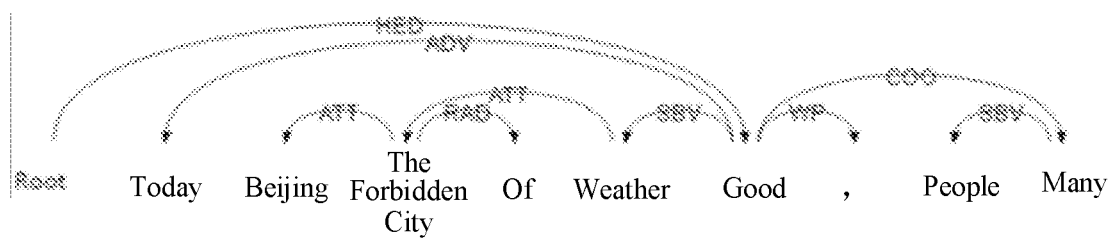
FIG. 3 is a schematic diagram illustrating dependence relationships between words of a first text, according to some embodiments of the present disclosure.

FIG. 3 is a schematic diagram illustrating dependence relationships between words of a first text, according to some embodiments of the present disclosure. As shown in FIG. 3, root may represent a root node of the dependence relationship, and the root node corresponds to the word "很好"; HED represents that the word "很好 (good)" is a core of the first text, and "很好 (good)" corresponds to "今天 (today)", "天气 (weather)", "," and "很多 (many)" respectively; ADV represents that the dependence relationships between "很好 (good)" and "今天 (today)" is an adverbial-head relationship; SBV represents that the dependence relationships between "很好 good)" and "天气 (weather)" is a subject-predicate relationship; WP represents that "," is a punctuation mark after "很好 (good)"; COO represents that the dependence relationships between "很好 (good)" and "很多 (many)" is a coordinate relationship, and "天气 (weather)" corresponds to "故宫 (the Forbidden City) "; ATT represents that the relationship between "天气 (weather)" and "故宫 (the Forbidden City)" is an attribute-head relationship, and "故宫 (the Forbidden City)" corresponds to "北京 (Beijing)" and "的 (of)" respectively; ATT represents that the dependence relationships between "故宫 (the Forbidden City)" and "北京 (Beijing)" is an attribute-head relationship; RAD represents that the relationship between "故宫 (the Forbidden City)" and "的 (of)" is a right auxiliary relationship, and "很多 (many)" corresponds to "人 (people)"; and SBV represents that the relationship between "很多 (many)" and "人 (people)" is the subject-predicate relationship.

In the example, dependency grammar analysis may be made over the multiple second texts respectively to obtain each dependence relationships between words of each second text. For example, dependency grammar analysis may be made over the second text "北京/故宫/的天气/很好/ /人/很多 (Beijing/the Forbidden City/of/weather/good/, /people/many)" corresponding to "今天 (today)" to obtain each dependence relationships between the words of the each second text.

Figure 4:
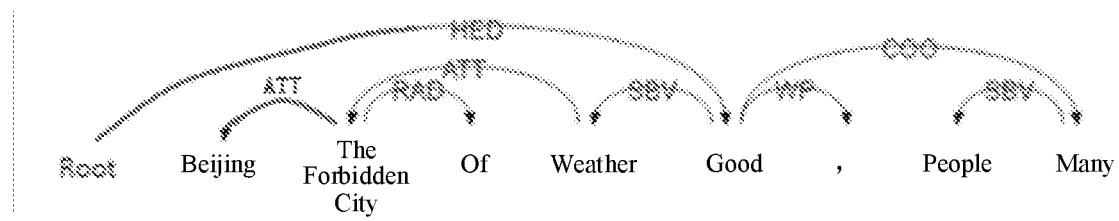
FIG. 4 is a schematic diagram illustrating dependence relationships between words of a second text, according to some embodiments of the present disclosure.

FIG. 4 is a schematic diagram illustrating dependence relationships between words of a second text, according to some embodiments of the present disclosure. As shown in FIG. 4, root may represent a root node of the dependence relationship, and the root node corresponds to the word "很好 (good)"; HED represents that the word "很好 (good)" is a core word of the first text, and "很好 (good)" corresponds to "天气 (weather)", "," and "很多 (many)" respectively; SBV represents that the dependence relationships between "很好 (good)" and "天气 (weather)" is a subject-predicate relationship; WP represents that "," is a punctuation mark after "很好 (good)"; COO represents that the dependence relationships between "很好 (good)" and "很多 (many)" is a coordinate relationship, and "天气 (weather)" is directed to "故宫 (the Forbidden City)"; ATT represents that the relationship between "天气 L(weather)" and "故宫 (the Forbidden City)" is an attribute-head relationship, and "故宫 (the Forbidden City)" corresponds to "北京 (Beijing)" and "的 (of)" respectively; ATT represents that the dependence relationships between "故宫 (the Forbidden City)" and "北京 (Beijing)" is an attribute-head relationship; RAD represents that the relationship between "故宫 (the Forbidden City)" and "的 (of)" is a right auxiliary relationship, and "很多 (many)" corresponds to "人 (people)"; and SBV represents that the relationship between "很多 (many)" and "人 (people)" is a subject-predicate relationship.

In the example, based on the dependency grammar analysis processing, dependence relationships between words may also be obtained, including: the dependence relationships between the words of the each second text "今天/北京/的天气 /很好/, /人/很多 (many)" corresponding to "故宫", the dependence relationships between the words of the each second text "今天/北京/故宫/天气/很好/, /人/很多 (today/Beijing/the Forbidden City/weather/good/, /people/many)" corresponding to "的 (of)", the dependence relationships between the words of the each second text "今天/北 京/故宫/的/很好/, /人/很多 (today/Beijing/the Forbidden City/of/good/, /people/ many)" corresponding to "大气 (weather)", the dependence relationships between the words of the each second text "今天/北京/故宫/的天气/, /人/很多 (today/Beijing/the Forbidden City/of/weather, /people/many)" corresponding to "很好 (good)", the dependence relationships between the words of the each second text "今天/北京/故宫/的天气/很好/ 人 / 很 多 (today/Beijing/the Forbidden City/of/weather/ good/people/many)" corresponding to ",", the dependence relationships between the words of the each second text "今天/北京/故宫/的 天气/很好/, /很多 (today/Beijing/the Forbidden City/of/weather/good/, /many)" corresponding to " 人 (people)". and the dependence relationships between the words of the each second text "今天/北京/故宫/的 天气/很好/, /人 (today/Beijing/the Forbidden City/of/weather/good/, /people)" corresponding to "很 多 (many)".

In some embodiments, in the block S142, the first tree structure of the first text may be obtained according to the dependence relationships between the multiple words of the first text, and the second tree structure of each second text may also be obtained according to the dependence relationships between words of the each second text.

In the example, the first tree structure may be determined according to the dependence relationships between the multiple words of the first text, namely each word of the first text is taken as a node and the first tree structure is determined according to a correspondence of each word in the dependence relationship.

Figure 5:
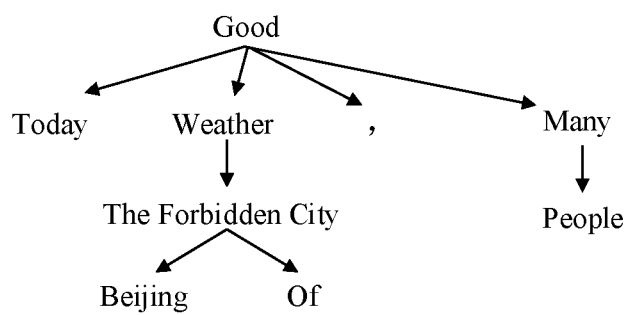
FIG. 5 is a schematic diagram illustrating a first tree structure, according to some embodiments of the present disclosure.

FIG. 5 is a schematic diagram illustrating a first tree structure, according to some embodiments of the present disclosure. As shown in FIG. 5, the core word "很好 (is god)" represented by root is a first node, the node "很好 (is god)" has four child nodes, namely the four words "今天 (today)", "天气 (weather)", ",", and "很多 (many)" corresponding to "很好 (is god)" in the dependence relationships of the first text; "今天 (today)" and "," have no child nodes; "天气 (weather)" has a child node "故宫 (the Forbidden City)"; "故宫 (the Forbidden City)" has two child nodes "北京" and "的 (of)"; and "很多 (many)" has a child node "人 (people)".

In the example, the second tree structure may be determined according to the dependence relationships between the words of the each second text, namely each word of the second text is taken as a node and the second tree structure is determined according to a correspondence of each word in the dependence relationship.

Figure 6:
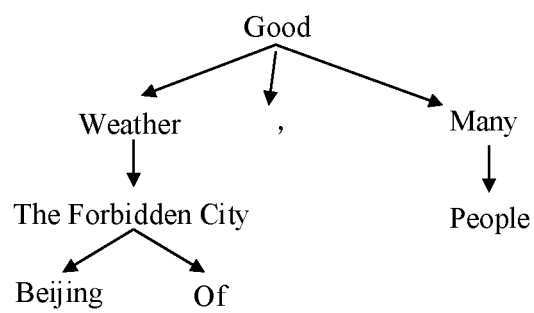
FIG. 6 is a schematic diagram illustrating a second tree structure, according to some embodiments of the present disclosure.

FIG. 6 is a schematic diagram illustrating a second tree structure, according to some embodiments of the present disclosure. As shown in FIG. 6, for example, in the second tree structure determined according to the dependence relationships between words of "北京/故宫/的/天气/很好/, 人/很多 (Beijing/the Forbidden City/of/weather/good/, /people/many)", the core word "很好 (good)" represented by root is a first node, the node "很好 (good)" has three child nodes, namely the three words "天气 (weather)", ",", and "很多 (many)" corresponding to "很好 (good)" in the dependence relationships of the second text; "," has no child nodes; "天气 (weather)" has a child node "故宫 (the Forbidden City)"; "故宫 (the Forbidden City)" has two child nodes "北京 (Beijing)" and "的"; and "很多 (many)" has one child node "人 (people)".

In the example, based on the dependence relationships between words of each second text, different second tree structures may also be obtained, including the second tree structure of "今天/北京/的天气/很好/, /人/很多 (today/Beijing/ of/weather/good/, /people/many)", the second tree structure of "今天/北京/故宫/天气/很好/ , /人/很多 (today/Beijing/the Forbidden City/weather/good/, /people/many)", the second tree structure of "今天/北京/故宫/的/很好/ /人/很多 (today/Beijing/the Forbidden City/of/good/, /people/many)", the second tree structure of "今天/北京/故宫/的天气/很 好/人/很多 (today/Beijing/the Forbidden City/of/weather/is good /people/many)", the second tree structure of "今天/北京/故宫/的天气/很好/, /很多 (today/Beijing/the Forbidden City/of/weather/good/, /many)" and the second tree structure of " 今天/北京/ 故宫/的天气/很好/, /人 (today/Beijing/the Forbidden City/of/weather/good/, /people)".

In such a manner, the first tree structure of the first text and the second tree structures of the second texts may be determined by dependency grammar analysis processing, and information such as word orders and syntactic structures may be reserved in the tree structures, so that the summary text obtained through the first tree structure and the second tree structures can be semantically fluent.

In some embodiments, in the block S15, a redundant word (i.e., a word that can be deleted with relatively little semantic influence) in the multiple words of the first text may be determined and deleted according to the first tree structure and the multiple second tree structures, and the left words may form the summary text of the first text.

Figure 7:
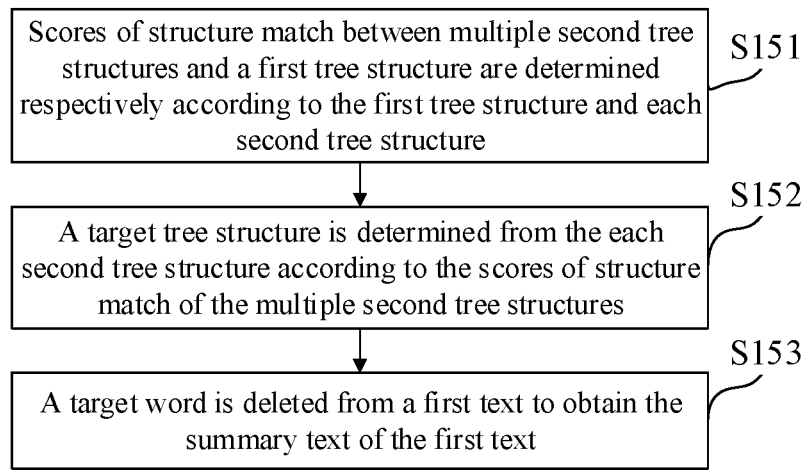
FIG. 7 is a flowchart illustrating the block S14 of a method for text processing, according to some embodiments of the present disclosure.

FIG. 7 is a flowchart illustrating the block S15 of a method for text processing, according to some embodiments of the present disclosure. As shown in FIG. 7, the block S15 includes the following blocks.

In block S151, scores of structure match between multiple second tree structures and the first tree structure are determined respectively according to the first tree structure and each second tree structure.

In block S152, a target tree structure is determined from the each second tree structure according to the scores of structure match of the multiple second tree structures.

In block S153, a target word is deleted from the first text to obtain the summary text of the first text, and the target word is a word missing from the second text with the target tree structure relative to the first text.

In some embodiments, in the block S151, the scores of structure match between the first tree structure and the multiple second tree structures may be determined respectively. In the example, the score of structure match may include a score of structure full match and a score of structure part match.

In some embodiments, the block S151 may include that: a score of node match between a first target node and a second target node is determined according to the first target node of the first tree structure, a child node of the first target node, the second target node of the second tree structure and a child node of the second target node; the first target node is any word in the first tree structure, and the second target node is a word the same as the first target node; and the scores of structure match between the second tree structures and the first tree structure are determined according to the scores of node match of multiple nodes.

In an example, the scores of node match of the same words in the first tree structure and the second tree structures may be determined respectively. The score of node match may include a score of node full match and a score of node part match.

FIG. 8 is a schematic diagram illustrating scores of structure match, according to some embodiments of the present disclosure. As shown in FIG. 8, the first text is "今 天/北京/故宫/的 天气/很好/, /人 / 很 多 (today/Beijing/the Forbidden City/of/weather/good/, /people/many)". For example, for the second text "北京/故宫/的 天气/很好/, /人/很多 (Beijing/the Forbidden City/of/weather/good/, /people/many)" obtained by removing "今天 (today)", a score of node match between each same word may be determined respectively, namely a score of node full match and a score of node part match of the same word may be determined. In an example, a score of node part match may include a Jaccard distance score and a hierarchical discount score.

In an example, a score of node match between each node (i.e., word) may be determined. For example, a score of node match may be determined according to a child node of each node. For example, the first target node and the second target node are "今天 (today)", the first tree structure has the node "今天 (today)", the second tree structure does not have the node "今天 (today)", and the score of node match of the node "今天 (today)" may be not calculated or the score of node match is determined to be 0. The first target node and the second target node are "北京 (Beijing)", the nodes "北京 (Beijing)" in both the first tree structure and the second tree structure have no child nodes, and the score of node match of the nodes "北京 " may be not calculated or the score of node match is determined to be 0. The first target node and the second target node are "故宫 (the Forbidden City)", and the nodes "故宫 (the Forbidden City)" in both the first tree structure and the second tree structure have child nodes "北京 (Beijing)" and "的 (of)", so that the sets formed by the child nodes of "故宫 (the Forbidden City)" in both the first tree structure and the second tree structure are the same, namely the set formed by the child nodes of "故宫 (the Forbidden City)" in the first tree structure is {"北京 (Beijing)", "的 (of)"} and includes two elements, and the set formed by the child nodes of "故宫 (the Forbidden City)" in the second tree structure is {"北京 (Beijing)", "的 (of)"} and includes two elements. A score of node full match of the two sets is calculated through a full match algorithm, and the score of node full match is 1 (the score of node full match is 1 when the child nodes are completely the same, and is 0 when the child nodes are not completely the same). When a score of node part match is calculated, a Jaccard distance of the two sets may be calculated to obtain that a Jaccard distance score is 1, and a hierarchical discount score of the two sets may be calculated to be 1 (a discount rate may be set to be 0.5, namely the hierarchical discount score is 1 if the child nodes are the same, while the hierarchical discount score is 0.5 if the child nodes are different but child nodes of the child nodes are the same, and the hierarchical discount score is multiplied by 0.5 if the child nodes of the child nodes are different). In such a calculation manner, scores of node match of "的(of)", ",", and "人 (people)" may be determined to be 0, and scores of node match of "天气 (weather)" and "很多 (many)" may both be determined to be 1. "很好 (good)" in the first tree structure has four child nodes, i.e., 今天 (today)", "天气 (weather)", ",", and "很多 (many)"; a set formed by the child nodes of "很好 (good)" in the first tree structure is {"今天 (today)", "天气 (weather)", ",", "很多 (many)"} and includes four elements; and a set formed by the child nodes of "很好 (good)" in the second tree structure is {"天气 (weather)", ",", "很多 (many)"} and includes three elements. A score of node full match between the two sets is calculated through the full match algorithm, and the score of node full match is 0. When a score of node part match is calculated, a Jaccard distance between the two sets may be calculated to obtain that a Jaccard distance score is 0.75, and a hierarchical discount score of the two sets may be calculated to be 0.5.

In some embodiments, the score of structure match between the first tree structure and the second tree structure may be determined according to the scores of node match of all the nodes. In the example, the scores of node full match of all the nodes may be summed to obtain the score of structure full match, and the scores of node part match of all the nodes may be summed to obtain the score of structure part match.

In an example, the first text is "今天/北京/故宫/的天气/很好/, /人/很多 (today/Beijing/the Forbidden City/of/weather/good/, /people/many)", the second text is "北京/故宫/的天气/很好/, /人/很多 (Beijing/the Forbidden City/of/weather/good/, /people/many)", the score of structure full match is 3, and for the score of structure part match, a total Jaccard distance score is 3.75 and a total hierarchical discount score is 3.5.

In some embodiments, the score of structure full match and score of structure part match between the first tree structure and each second tree structure are determined respectively in the aforesaid manner.

In some embodiments, in the block S152, a target tree structure may be determined according to the scores of structure match of the multiple second tree structures. In an example, the scores of structure match between the first tree structure and the second tree structures may be arranged in a descending order. In a process of arrangement, arrangement may be performed according to the scores of structure full match at first; if the scores of structure full match between two or more second tree structures and the first tree structure are the same, the two or more second tree structures are arranged according to the scores of structure part match. In a process of arrangement according to the scores of structure part match, arrangement in a descending order may be performed according to the Jaccard distance scores at first, and if the Jaccard distance scores are the same, arrangement in a descending order may be performed according to the hierarchical discount scores. For example, if a score of structure full match of a second tree structure corresponding to word A is 3 and a score of structure full match of a second tree structure corresponding to word B is 2, then the second tree structure corresponding to the word A is arranged before the second tree structure corresponding to the word B. For another example, upon when the score of structure full match of the second tree structure corresponding to the word A is 3 and the score of structure full match of the second tree structure corresponding to the word B is 3, and further upon that a Jaccard distance score of the second tree structure corresponding to the word A is 3.75 and that a Jaccard distance score of the second tree structure corresponding to the word B is 4, the second tree structure corresponding to the word B is arranged before the second tree structure corresponding to the word A. For another example, upon when the score of structure full match of the second tree structure corresponding to the word A is 3 and the score of structure full match of the second tree structure corresponding to the word B is 3, and further upon that the Jaccard distance score of the second tree structure corresponding to the word A is 3.75 and that the Jaccard distance score of the second tree structure corresponding to the word B is 3.75, and still further upon that a hierarchical discount score of the second tree structure corresponding to the word A is 3.5 and that a hierarchical discount score of the second tree structure corresponding to the word B is 3, the second tree structure corresponding to the word A is arranged before the second tree structure corresponding to the word B. Thus, an order of the multiple second tree structures can be obtained through the aforesaid method.

In the example, the first i second tree structures may be selected as target tree structures, i (i<n) being a preset value. The scores of structure match between the first i second tree structures and the first tree structure are relatively high, namely semantic similarities between the second texts corresponding to the first i second tree structures and the first text are relatively high, so that words missing from the second texts with the first i second tree structures relative to the first text have relatively little semantic influence on the first text.

In some embodiments, in the block S153, the words (i.e., target words) missing from the second text with the first i second tree structures relative to the first text may be deleted from the first text, namely a summary text with a higher semantic similarity with the first text may be obtained under the condition of having less semantic influence on the first text.

In such a manner, a target word may be determined according to the score of structure match between the first tree structure and the second tree structure to obtain the summary text, so that a redundant word may be removed to obtain the summary text with a relatively high semantic similarity with the first text under the condition of having less semantic influence on the first text.

Figure 9:
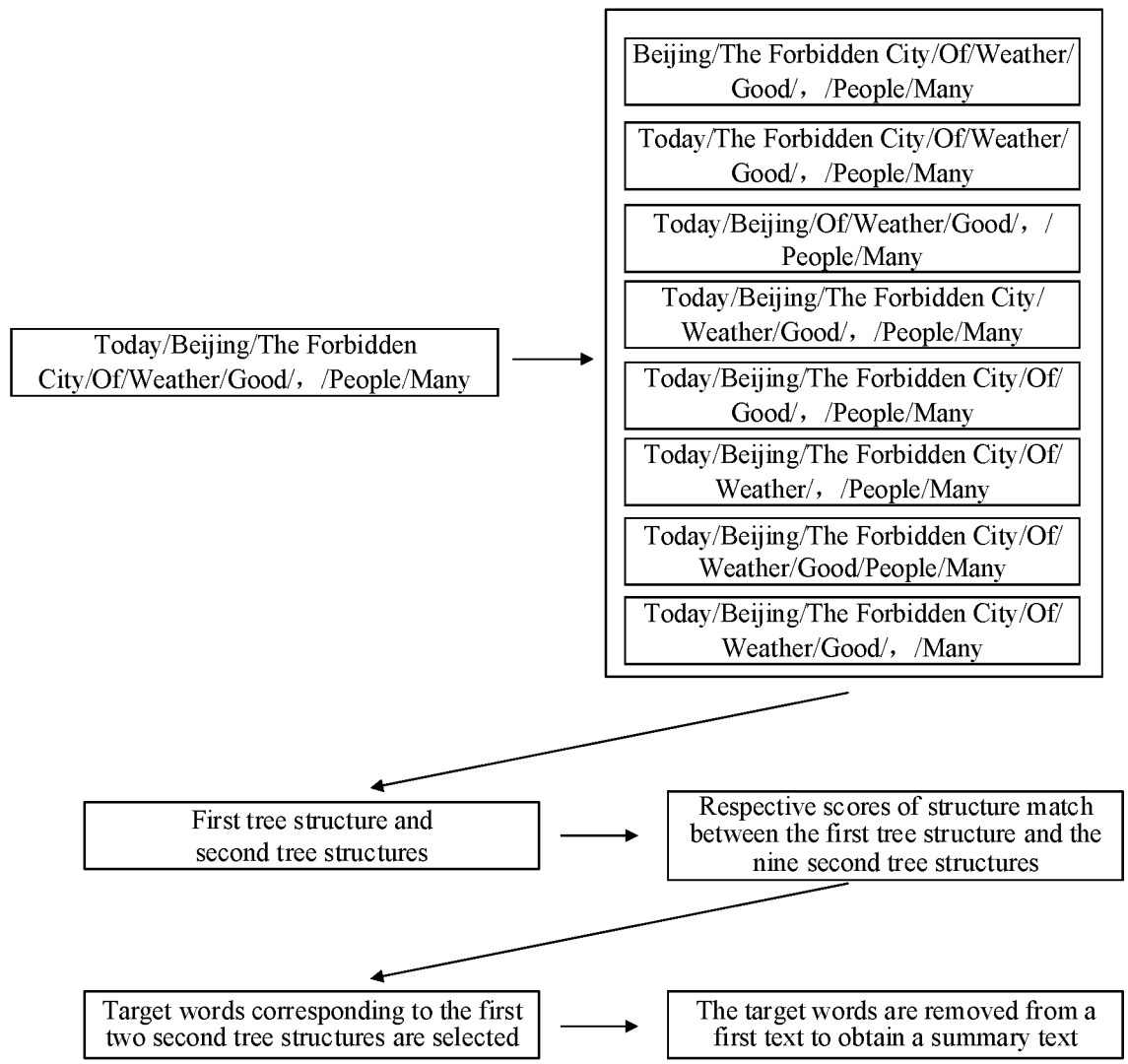
FIG. 9 is a schematic diagram illustrating application of a method for text processing, according to some embodiments of the present disclosure.

FIG. 9 is a schematic diagram illustrating application of a method for text processing, according to some embodiments of the present disclosure. As shown in FIG. 9, a word segmentation result of a first text "今天北京故宫的天气很好，人很多 (Weather of the Forbidden City in Beijing is good, many people)" is "今天/北京/故宫/ 的 天气 / 很好 / ， / 人 / 很 多 (today/Beijing/the Forbidden City/of/weather/good/, /people/many)".

In some embodiments, each word may be removed from the first text to obtain nine second texts, i.e., "北京/故宫/的天气/很好/ , /人/很多 (Beijing/the Forbidden City/of/weather/good/, /people/many)", "今天/故宫/的天气/很好/ , /人/很多 (today/the Forbidden City/of/weather/good/, /people/many)", "今天/北京/的天气/很好/ , /人/很多 (today/Beijing/of/weather/good/, /people/many)", "今天/北京/故宫/天气/很好/ , /人/很 多 (today/Beijing/the Forbidden City/weather/good/, /people/many)", "今天/北京/故宫 的/很好/ /人/很多 (today/Beijing/the Forbidden City/of/good/, /people/many)", "今天/ 北京/故宫/的天气/ , /人/很多 (today/Beijing/the Forbidden City/of/weather, /people/many)", "今天/北京/故宫/的天 气/很好/人/很多 (today/Beijing/the Forbidden City/of/weather/is good /people/ many)", "今天/北京/故宫/的 天气/很好/ , /很多 (today/Beijing/the Forbidden City/of/weather/good/, /many)" and "今天/北京/故宫/的 天气/很好/ , /人 (today/Beijing/the Forbidden City/of/weather/good/, /people)".

In some embodiments, dependency grammar analysis may be made over the first text and the nine second texts to obtain dependence relationships between the multiple words of the first text and dependence relationships between words of each second text, and a first tree structure and nine second tree structures are determined according to the dependence relationships between all the words, for example, correspondences between words in the dependence relationship.

In some embodiments, a total Jaccard distance score, a total hierarchical discount score and a score of structure full match between the first tree structure and each second tree structure may be determined respectively, and arrangement in a descending order is arranged according to the scores of structure full match, the total Jaccard distance scores and the total hierarchical discount scores. In an example, arrangement may be performed according to scores of structure full match at first; under the condition that the scores of structure full match are the same arrangement is performed according to the total Jaccard distance scores; and under the condition that the total Jaccard distance scores are the same, arrangement is performed according to hierarchical discount scores. In such a manner, an order of the nine second tree structures may be obtained.

In some embodiments, the first two second tree structures may be determined as target tree structures, and words corresponding to the first two second tree structures are determined as target words, the target words being two words with minimum semantic influence on the first text. In an example, the target words are "的 (of)" and "，", and "的 (of)" and "，" may be removed from the first text to obtain "今天/北京/故宫/天气 /很好/人/很多 (today/Beijing/the Forbidden City/ weather/good/people/many)", namely a summary text of the first text is "今天北京故宫天气很好人很多 (weather the Forbidden City in Beijing is good many people)".

According to the method for text processing of the embodiment of the present disclosure, manual annotation and training are avoided, and a workload in manual annotation is reduced. Since training of a large amount of annotation data is not needed, the range of application can be extended. A second text corresponding to each word of the first text may be obtained by deleting each word from the first text, so that a probability of ignoring key information is reduced. The first tree structure of the first text and the second tree structures of the second texts may be determined by dependency grammar analysis, and information such as word orders and syntactic structures may be reserved in the tree structures, so that the summary text obtained through the first tree structure and the second tree structures is semantically fluent. Furthermore, the target word may be determined according to the score of structure match between the first tree structure and the second tree structure to obtain the summary text, so that the summary text with the relatively high semantic similarity with the first text may be obtained by removing a redundant word under the condition of having little semantic influence on the first text.

Figure 10:
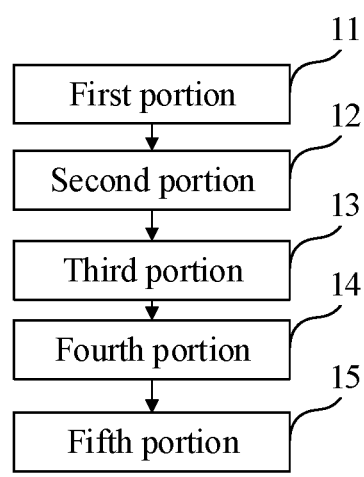
FIG. 10 is a block diagram of a device for text processing, according to some embodiments of the present disclosure.

FIG. 10 is a block diagram of a device for text processing, according to some embodiments of the present disclosure. As shown in FIG. 10, the device includes:

a first portion 11, configured to perform word segmentation on a first text to be processed to determine multiple words of the first text;

a second portion 12, configured to remove, from the first text, one word in the multiple words of the first text to obtain one second text;

a third portion 13, configured to remove each word from the first text one by one to obtain a second text set;

a fourth portion 14, configured to analyze the first text and each second text in the second text set respectively to obtain a first tree structure of the first text and a second tree structure of each second text, each word in the first text being a node of the first tree structure and each word in the second text being a node of the second tree structure; and a fifth portion 15, configured to determine a summary text of the first text according to the first tree structure and each second tree structure.

Figure 11:
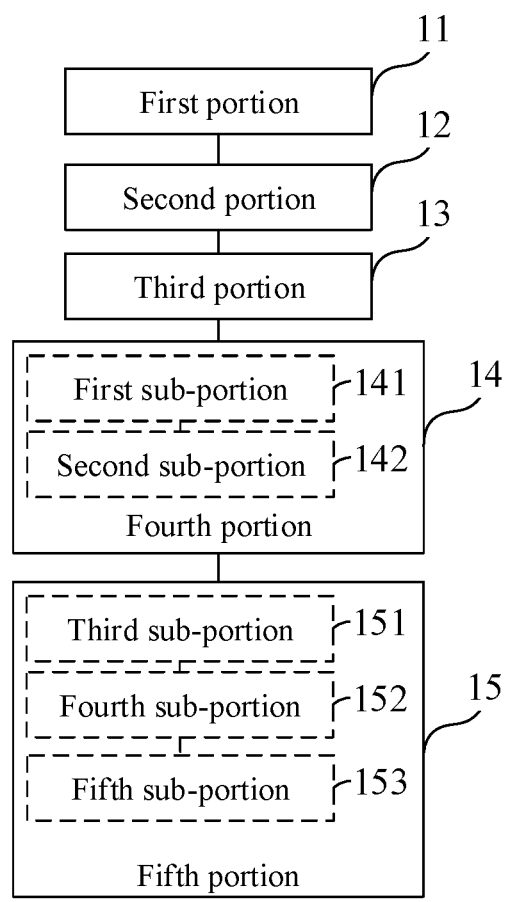
FIG. 11 is a block diagram of a device for text processing, according to some embodiments of the present disclosure.

FIG. 11 is a block diagram of a device for text processing, according to some embodiments of the present disclosure. As shown in FIG. 11, the fourth portion 14 includes:

a first sub-portion 141, configured to make dependency grammar analysis over the first text and each second text respectively to obtain dependence relationships between the multiple words of the first text and dependence relationships between words of each second text respectively; and a second sub-portion 142, configured to obtain the first tree structure of the first text and the second tree structure of each second text respectively according to the dependence relationships between the multiple words of the first text and the dependence relationships between the words of the each second text.

In some embodiments, the fifth portion 15 may include:

a third sub-portion 151, configured to determine scores of structure match between multiple second tree structures and the first tree structure respectively according to the first tree structure and the each second tree structure;

a fourth sub-portion 152, configured to determine a target tree structure from the each second tree structure according to the scores of structure match of the second tree structures; and a fifth sub-portion 153, configured to delete a target word from the first text to obtain the summary text of the first text, the target word being a word missing from the second text with the target tree structure relative to the first text.

In some embodiments, the third sub-portion 151 is further configured to:

determine a score of node match between a first target node and a second target node according to the first target node of the first tree structure, a child node of the first target node, the second target node of the second tree structure and a child node of the second target node, the first target node being any word in the first tree structure and the second target node being a word the same as the first target node; and determine scores of structure match between the second tree structures and the first tree structure according to the scores of node match of multiple nodes.

In some embodiments, the score of structure match may include a score of structure full match and a score of structure part match.

With respect to the device in the above embodiment, the specific way for performing operations by individual portions therein has been described in detail in the embodiment regarding the method, which will not be elaborated herein.

Figure 12:
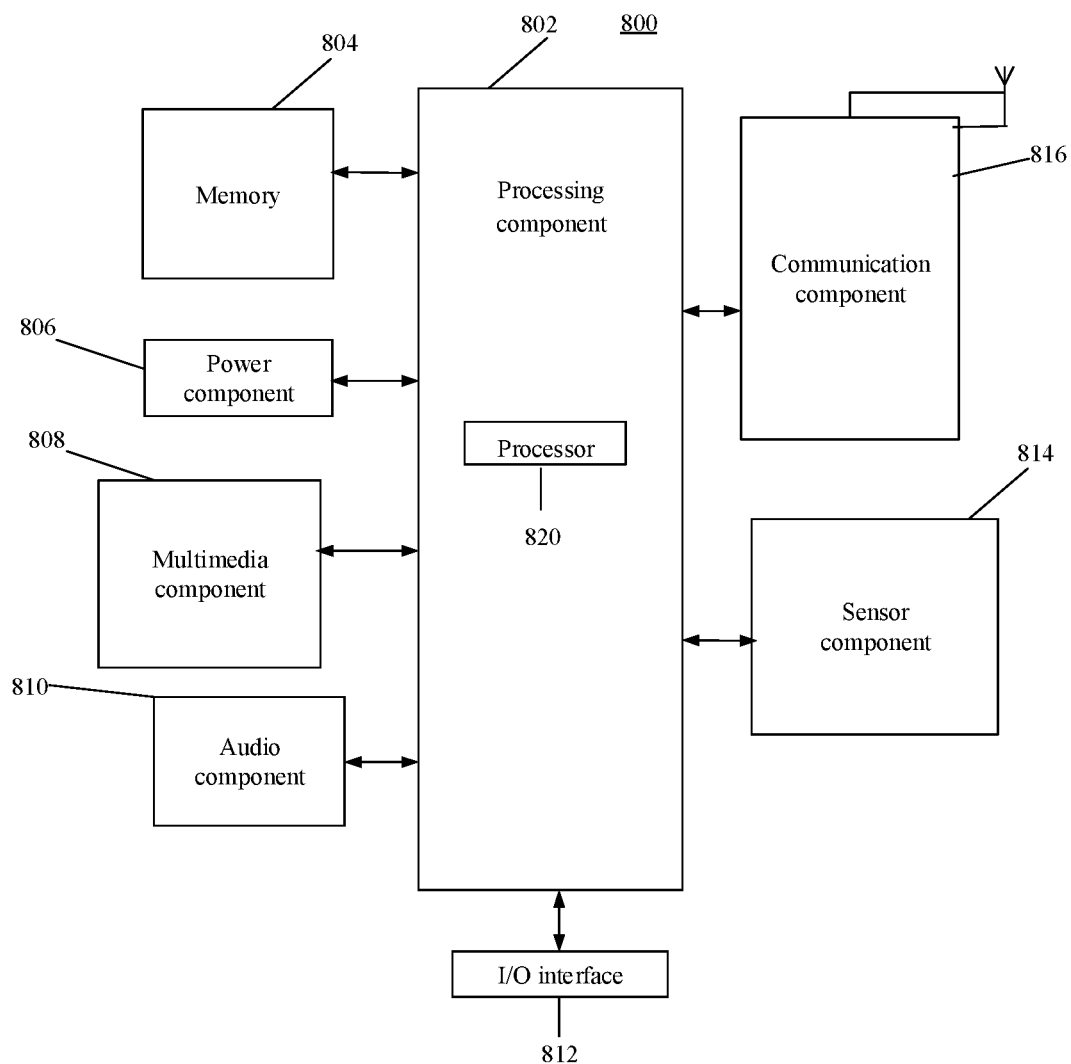
FIG. 12 is a block diagram of a device for text processing, according to some embodiments of the present disclosure.

FIG. 12 is a block diagram of a device 800 for text processing, according to some embodiments of the present disclosure. For example, the device 800 may be a mobile phone, a computer, a digital broadcast terminal, a messaging device, a gaming console, a tablet, a medical device, exercise equipment, a personal digital assistant and the like.

Referring to FIG. 12, the device 800 may include one or more of the following components: a processing component 802, a memory 804, a power component 806, a multimedia component 808, an audio component 810, an Input/Output (I/O) interface 812, a sensor component 814, and a communication component 816.

The processing component 802 is typically configured to control overall operations of the device 800, such as the operations associated with display, telephone calls, data communications, camera operations, and recording operations. The processing component 802 may include one or more processors 820 to execute instructions to perform all or part of the blocks in the aforesaid method. Moreover, the processing component 802 may include one or more modules which facilitate interaction between the processing component 802 and the other components. For instance, the processing component 802 may include a multimedia module to facilitate interaction between the multimedia component 808 and the processing component 802.

The memory 804 is configured to store various types of data to support the operation of the device 800. Examples of such data include instructions for any application programs or methods operated on the device 800, contact data, phonebook data, messages, pictures, video, etc. The memory 804 may be implemented by any type of volatile or non-volatile memory devices, or a combination thereof, such as an Electrically Erasable Programmable Read-Only Memory (EEPROM), an Erasable Programmable Read-Only Memory (EPROM), a Programmable Read-Only Memory (PROM), a Read-Only Memory (ROM), a magnetic memory, a flash memory, and a magnetic or optical disk.

The power component 806 is configured to provide power for various components of the device 800. The power component 806 may include a power management system, one or more power supplies, and other components associated with generation, management and distribution of power for the device 800.

The multimedia component 808 may include a screen for providing an output interface between the device 800 and a user. In some embodiments, the screen may include a Liquid Crystal Display (LCD) and a Touch Panel (TP). In some embodiments, organic light-emitting diode (OLED) or other types of displays can be employed. If the screen includes the TP, the screen may be implemented as a touch screen to receive an input signal from the user. The TP may include one or more touch sensors to sense touches, swipes and gestures on the TP. The touch sensors may not only sense a boundary of a touch or swipe action but also detect a duration and pressure associated with the touch or swipe action. In some embodiments, the multimedia component 808 may include a front camera and/or a rear camera. The front camera and/or the rear camera may receive external multimedia data when the device 800 is in an operation mode, such as a photographing mode or a video mode. Each of the front camera and the rear camera may be a fixed optical lens system or have focusing and optical zooming capabilities.

The audio component 810 is configured to output and/or input an audio signal. For example, the audio component 810 may include a Microphone (MIC), and the MIC is configured to receive an external audio signal when the device 800 is in the operation mode, such as a call mode, a recording mode and a voice recognition mode. The received audio signal may further be stored in the memory 804 or sent through the communication component 816. In some embodiments, the audio component 810 may further include a speaker configured to output the audio signal.

The I/O interface 812 is configured to provide an interface between the processing component 802 and a peripheral interface module, and the peripheral interface module may be a keyboard, a click wheel, a button and the like. The button may include, but not limited to: a home button, a volume button, a starting button and a locking button.

The sensor component 814 may include one or more sensors configured to provide status assessment in various aspects for the device 800. For instance, the sensor component 814 may detect an on/off status of the device 800 and relative positioning of components, such as a display and small keyboard of the device 800, and the sensor component 814 may further detect a change in a position of the device 800 or a component of the device 800, presence or absence of contact between the user and the device 800, orientation or acceleration/deceleration of the device 800 and a change in temperature of the device 800. The sensor component 814 may include a proximity sensor configured to detect presence of an object nearby without any physical contact. The sensor component 814 may also include a light sensor, such as a Complementary Metal Oxide Semiconductor (CMOS) or Charge Coupled Device (CCD) image sensor, configured for use in an imaging APP. In some embodiments, the sensor component 814 may also include an acceleration sensor, a gyroscope sensor, a magnetic sensor, a pressure sensor or a temperature sensor.

The communication component 816 is configured to facilitate wired or wireless communication between the device 800 and other equipment. The device 800 may access a communication-standard-based wireless network, such as a Wireless Fidelity (Wi-Fi) network, a 2nd-Generation (2G), 3rd-Generation (3G) network, $4^{th}$-Generation (4G), or $5^{th}$-Generation (5G) network or a combination thereof. In some embodiments, the communication component 816 is configured to receive a broadcast signal or broadcast associated information from an external broadcast management system through a broadcast channel. In some embodiments, the communication component 816 may further include a Near Field Communication (NFC) module to facilitate short-range communication. For example, the NFC module may be implemented based on a Radio Frequency Identification (RFID) technology, an Infrared Data Association (IrDA) technology, an Ultra-WideBand (UWB) technology, a Bluetooth (BT) technology and another technology.

The various device components, circuits, modules, units, blocks, or portions may have modular configurations, or are composed of discrete components, but nonetheless may be referred to as "modules" in general. In other words, the "components," "circuits," "modules," "units," "blocks," or "portions" referred to herein may or may not be in modular forms.

In some embodiments, the device 800 may be implemented by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), controllers, micro-controllers, microprocessors or other electronic components, and is configured to execute the aforesaid method.

In some embodiments, there is also provided a non-transitory computer-readable storage medium including an instruction, such as the memory 804 including an instruction, and the instruction may be executed by the processor 820 of the device 800 to implement the aforesaid method. For example, the non-transitory computer-readable storage medium may be a ROM, a Random-Access Memory (RAM), a Compact Disc Read-Only Memory (CD-ROM), a magnetic tape, a floppy disc, an optical data storage device and the like.

Figure 13:
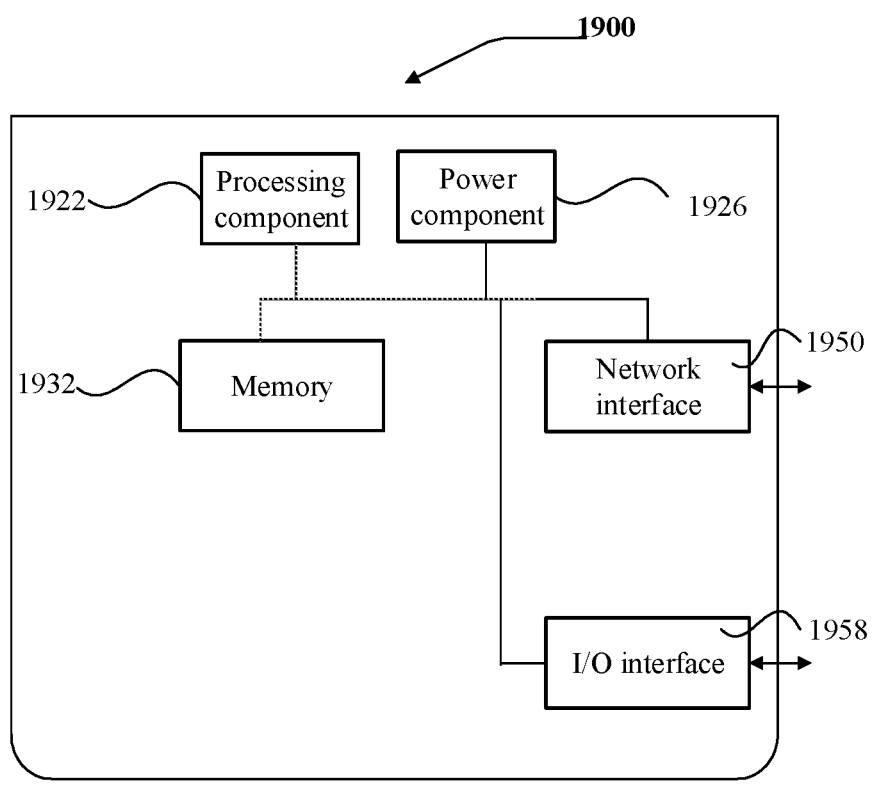
FIG. 13 is a block diagram of a device for text processing, according to some embodiments of the present disclosure.

FIG. 13 is a block diagram of a device 1900 for text processing, according to some embodiments of the present disclosure. For example, the device 1900 may be provided as a server. Referring to FIG. 13, the device 1900 includes a processing component 1922 which further includes one or more processors, and a memory resource represented by a memory 1932 configured to store an instruction executable by the processing component 1922, for example, an application program. The application program stored in the memory 1932 may include one or more than one portion of which each corresponds to a set of instructions. In addition, the processing component 1922 is configured to execute the instruction to execute the aforesaid method.

The device 1900 may further include a power component 1926 configured to execute power management of the device 1900, a wired or wireless network interface 1950 configured to connect the device 1900 to a network, and an I/O interface 1958. The device 1900 may be operated based on an operating system stored in the memory 1932, for example, Windows Server™, Max OS X™, Unix™, Linux™, FreeBSD™ or the like.

In some embodiments, there is also provided a non-transitory computer-readable storage medium including an instruction, such as the memory 1932 including an instruction, and the instruction may be executed by the processing component 1922 of the device 1900 to implement the aforesaid method. For example, the non-transitory computer-readable storage medium may be a ROM, a RAM, a CD-ROM, a magnetic tape, a floppy disc, an optical data storage device and the like.

In the present disclosure, the terms "installed," "connected," "coupled," "fixed" and the like shall be understood broadly, and can be either a fixed connection or a detachable connection, or integrated, unless otherwise explicitly defined. These terms can refer to mechanical or electrical connections, or both. Such connections can be direct connections or indirect connections through an intermediate medium. These terms can also refer to the internal connections or the interactions between elements. The specific meanings of the above terms in the present disclosure can be understood by those of ordinary skill in the art on a case-by-case basis.

In the description of the present disclosure, the terms "one embodiment," "some embodiments," "example," "specific example," or "some examples," and the like can indicate a specific feature described in connection with the embodiment or example, a structure, a material or feature included in at least one embodiment or example. In the present disclosure, the schematic representation of the above terms is not necessarily directed to the same embodiment or example.

Moreover, the particular features, structures, materials, or characteristics described can be combined in a suitable manner in any one or more embodiments or examples. In addition, various embodiments or examples described in the specification, as well as features of various embodiments or examples, can be combined and reorganized.

In some embodiments, the control and/or interface software or app can be provided in a form of a non-transitory computer-readable storage medium having instructions stored thereon is further provided. For example, the non-transitory computer-readable storage medium can be a ROM, a CD-ROM, a magnetic tape, a floppy disk, optical data storage equipment, a flash drive such as a USB drive or an SD card, and the like.

Implementations of the subject matter and the operations described in this disclosure can be implemented in digital electronic circuitry, or in computer software, firmware, or hardware, including the structures disclosed herein and their structural equivalents, or in combinations of one or more of them. Implementations of the subject matter described in this disclosure can be implemented as one or more computer programs, i.e., one or more portions of computer program instructions, encoded on one or more computer storage medium for execution by, or to control the operation of, data processing apparatus.

Alternatively, or in addition, the program instructions can be encoded on an artificially-generated propagated signal, e.g., a machine-generated electrical, optical, or electromagnetic signal, which is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them.

Moreover, while a computer storage medium is not a propagated signal, a computer storage medium can be a source or destination of computer program instructions encoded in an artificially-generated propagated signal. The computer storage medium can also be, or be included in, one or more separate components or media (e.g., multiple CDs, disks, drives, or other storage devices). Accordingly, the computer storage medium can be tangible.

The operations described in this disclosure can be implemented as operations performed by a data processing apparatus on data stored on one or more computer-readable storage devices or received from other sources.

The devices in this disclosure can include special purpose logic circuitry, e.g., an FPGA (field-programmable gate array), or an ASIC (application-specific integrated circuit). The device can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The devices and execution environment can realize various different computing model infrastructures, such as web services, distributed computing, and grid computing infrastructures.

A computer program (also known as a program, software, software application, app, script, or code) can be written in any form of programming language, including compiled or interpreted languages, declarative or procedural languages, and it can be deployed in any form, including as a stand-alone program or as a portion, component, subroutine, object, or other portion suitable for use in a computing environment. A computer program can, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more portions, sub-programs, or portions of code). A computer program can be deployed to be executed on one computer or on multiple computers that are located at one site or distributed across multiple sites and interconnected by a communication network.

The processes and logic flows described in this disclosure can be performed by one or more programmable processors executing one or more computer programs to perform actions by operating on input data and generating output. The processes and logic flows can also be performed by, and apparatus can also be implemented as, special purpose logic circuitry, e.g., an FPGA, or an ASIC.

Processors or processing circuits suitable for the execution of a computer program include, by way of example, both general and special purpose microprocessors, and any one or more processors of any kind of digital computer. Generally, a processor will receive instructions and data from a read-only memory, or a random-access memory, or both. Elements of a computer can include a processor configured to perform actions in accordance with instructions and one or more memory devices for storing instructions and data.

Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few.

Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, implementations of the subject matter described in this specification can be implemented with a computer and/or a display device, e.g., a VR/AR device, a head-mount display (HMD) device, a head-up display (HUD) device, smart eyewear (e.g., glasses), a CRT (cathode-ray tube), LCD (liquid-crystal display), OLED (organic light emitting diode), or any other monitor for displaying information to the user and a keyboard, a pointing device, e.g., a mouse, trackball, etc., or a touch screen, touch pad, etc., by which the user can provide input to the computer.

Implementations of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components.

The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

While this specification contains many specific implementation details, these should not be construed as limitations on the scope of any claims, but rather as descriptions of features specific to particular implementations. Certain features that are described in this specification in the context of separate implementations can also be implemented in combination in a single implementation. Conversely, various features that are described in the context of a single implementation can also be implemented in multiple implementations separately or in any suitable subcombination.

Moreover, although features can be described above as acting in certain combinations and even initially claimed as such, one or more features from a claimed combination can in some cases be excised from the combination, and the claimed combination can be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing can be advantageous. Moreover, the separation of various system components in the implementations described above should not be understood as requiring such separation in all implementations, and it should be understood that the described program components and systems can generally be integrated together in a single software product or packaged into multiple software products.

As such, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking or parallel processing can be utilized.

It is intended that the specification and embodiments be considered as examples only. Other embodiments of the disclosure will be apparent to those skilled in the art in view of the specification and drawings of the present disclosure. That is, although specific embodiments have been described above in detail, the description is merely for purposes of illustration. It should be appreciated, therefore, that many aspects described above are not intended as required or essential elements unless explicitly stated otherwise.

Various modifications of, and equivalent acts corresponding to, the disclosed aspects of the example embodiments, in addition to those described above, can be made by a person of ordinary skill in the art, having the benefit of the present disclosure, without departing from the spirit and scope of the disclosure defined in the following claims, the scope of which is to be accorded the broadest interpretation so as to encompass such modifications and equivalent structures.

It should be understood that "a plurality" or "multiple" as referred to herein means two or more. "And/or," describing the association relationship of the associated objects, indicates that there may be three relationships, for example, A and/or B may indicate that there are three cases where A exists separately, A and B exist at the same time, and B exists separately. The character "/" generally indicates that the contextual objects are in an "or" relationship.

In the present disclosure, it is to be understood that the terms "lower," "upper," "under" or "beneath" or "underneath," "above," "front," "back," "left," "right," "top," "bottom," "inner," "outer," "horizontal," "vertical," and other orientation or positional relationships are based on example orientations illustrated in the drawings, and are merely for the convenience of the description of some embodiments, rather than indicating or implying the device or component being constructed and operated in a particular orientation. Therefore, these terms are not to be construed as limiting the scope of the present disclosure.

In the present disclosure, a first element being "on" a second element may indicate direct contact between the first and second elements, without contact, or indirect geometrical relationship through one or more intermediate media or layers, unless otherwise explicitly stated and defined. Similarly, a first element being "under," "underneath" or "beneath" a second element may indicate direct contact between the first and second elements, without contact, or indirect geometrical relationship through one or more intermediate media or layers, unless otherwise explicitly stated and defined.

Some other embodiments of the present disclosure can be available to those skilled in the art upon consideration of the specification and practice of the various embodiments disclosed herein. The present application is intended to cover any variations, uses, or adaptations of the present disclosure following general principles of the present disclosure and include the common general knowledge or conventional technical means in the art without departing from the present disclosure. The specification and examples can be shown as illustrative only, and the true scope and spirit of the disclosure are indicated by the following claims.

The invention claimed is:

1. A method for text processing, comprising:
performing word segmentation on a first text to be processed to determine multiple words of the first text;
for each of the multiple words of the first text, removing, from the first text, the word to obtain a respective one of multiple second texts, wherein the multiple second texts form a second text set, and a number of the multiple second texts in the second text set is equal to a number of the multiple words of the first text;
analyzing the first text and each second text in the second text set respectively to obtain a first tree structure of the first text and a second tree structure of the each second text, wherein each of the multiple words in the first text is a node of the first tree structure, and each of words in the each second text is a node of the each second tree structure; and
determining a summary text of the first text according to the first tree structure and the each second tree structure.

2. The method of claim 1, wherein the analyzing the first text and the each second text in the second text set respectively to obtain the first tree structure of the first text and the second tree structure of the each second text comprises:
making dependency grammar analysis over the first text and the each second text respectively to obtain dependence relationships between the multiple words of the first text and dependence relationships between the words of the each second text respectively; and
obtaining the first tree structure of the first text and the second tree structure of the each second text respectively according to the dependence relationships between the multiple words of the first text and the dependence relationships between the words of the each second text.

3. The method of claim 1, wherein the determining the summary of the text to be processed according to the first tree structure and the each second tree structure comprises:
determining scores of structure match between multiple second tree structures and the first tree structure respectively according to the first tree structure and the each second tree structure;
determining a target tree structure from the each second tree structure according to the scores of structure match of the multiple second tree structures; and
deleting a target word from the first text to obtain the summary text of the first text, wherein the target word is a word missing from a second text with the target tree structure relative to the first text.

4. The method of claim 3, wherein the determining the scores of structure match between the multiple second tree structures and the first tree structure respectively according to the first tree structure and the each second tree structure comprises:
determining a score of node match between a first target node and a second target node according to the first target node of the first tree structure, a child node of the first target node, the second target node of the second tree structure and a child node of the second target node, wherein the first target node is any word in the first tree structure and the second target node is a word the same as the first target node; and
determining the scores of structure match between the multiple second tree structures and the first tree structure according to the scores of node match of multiple nodes.

5. The method of claim 4, wherein the scores of structure match comprise scores of structure full match and scores of structure part match.

6. The method of claim 3, wherein the scores of structure match comprise scores of structure full match and scores of structure part match.

7. A mobile phone implementing the method of claim 1, the mobile phone comprising a display screen.

8. The mobile phone of claim 7, wherein the display screen is configured to display the summary text that is semantically fluent, wherein each of the multiple second texts is obtained by removing a respective word from the first text such that probability of ignoring key information is reduced.

9. A device for text processing, comprising:
a processor; and
a memory configured to store an instruction executable for the processor,
wherein the processor is configured to execute blocks of:
performing word segmentation on a first text to be processed to determine multiple words of the first text;
for each of the multiple words of the first text, removing, from the first text, the word to obtain a respective one of multiple second texts, wherein the multiple second texts form a second text set, and a number of the multiple second texts in the second text set is equal to a number of the multiple words of the first text;
analyzing the first text and each second text in the second text set respectively to obtain a first tree structure of the first text and a second tree structure of the each second text, wherein each of the multiple words in the first text is a node of the first tree structure, and each of words in the each second text is a node of the each second tree structure; and
determining a summary text of the first text according to the first tree structure and the each second tree structure.

10. The device of claim 9, wherein the processor is further configured to execute blocks of:
making dependency grammar analysis over the first text and the each second text-respectively to obtain dependence relationships between the multiple words of the first text and dependence relationships between the words of the each second text respectively; and
obtaining the first tree structure of the first text and the second tree structure of the each second text respectively according to the dependence relationships between the multiple words of the first text and the dependence relationships between the words of the each second text.

11. The device of claim 10, wherein the processor is further configured to execute blocks of:

determining scores of structure match between multiple second tree structures and the first tree structure respectively according to the first tree structure and the each second tree structure;
determining a target tree structure from the each second tree structure according to the scores of structure match of the multiple second tree structures; and
deleting a target word from the first text to obtain the summary text of the first text, wherein the target word is a word missing from a second text with the target tree structure relative to the first text.

12. The device of claim 11, wherein the processor is further configured to execute blocks of:
determining a score of node match between a first target node and a second target node according to the first target node of the first tree structure, a child node of the first target node, the second target node of the second tree structure and a child node of the second target node, wherein the first target node is any word in the first tree structure and the second target node is a word the same as the first target node; and
determining the scores of structure match between the multiple second tree structures and the first tree structure according to the scores of node match of multiple nodes.

13. The device of claim 12, wherein the scores of structure match comprise scores of structure full match and scores of structure part match.

14. The device of claim 11, wherein the scores of structure match comprise scores of structure full match and scores of structure part match.

15. A non-transitory computer-readable storage medium, having an instruction therein, when executed by a processor, to enable the processor to execute the method of claim 1.

16. A non-transitory computer-readable storage medium, having an instruction therein, when executed by a processor, to enable the processor to execute the method of claim 2.

17. A non-transitory computer-readable storage medium, having an instruction therein, when executed by a processor, to enable the processor to execute the method of claim 3.

18. A non-transitory computer-readable storage medium, having an instruction therein, when executed by a processor, to enable the processor to execute the method of claim 4.

19. A non-transitory computer-readable storage medium, having an instruction therein, when executed by a processor, to enable the processor to execute the method of claim 6.

20. A non-transitory computer-readable storage medium, having an instruction therein, when executed by a processor, to enable the processor to execute the method of claim 5.

* * * * *